(12) United States Patent
Kung

(10) Patent No.: US 10,015,590 B2
(45) Date of Patent: Jul. 3, 2018

(54) SWITCHING DEVICE FOR A TRUE DIVERSITY RECEIVER

(71) Applicant: Chiayo Electronics Co., Ltd., Chiayi (TW)

(72) Inventor: Te-Wei Kung, Chiayi (TW)

(73) Assignee: Chiayo Electronics Co., Ltd., Chiayi (TW)

( * ) Notice: Subject to any disclaimer, the term of this patent is extended or adjusted under 35 U.S.C. 154(b) by 0 days.

(21) Appl. No.: 15/203,019

(22) Filed: Jul. 6, 2016

(65) Prior Publication Data

US 2018/0014118 A1   Jan. 11, 2018

(51) Int. Cl.
| | |
|---|---|
| *H04R 5/02* | (2006.01) |
| *H04R 3/00* | (2006.01) |
| *H04B 7/08* | (2006.01) |
| *H04H 60/04* | (2008.01) |

(52) U.S. Cl.
CPC .......... *H04R 3/005* (2013.01); *H04B 7/0888* (2013.01); *H04H 60/04* (2013.01); *H04B 7/0802* (2013.01); *H04B 7/0814* (2013.01); *H04B 7/0825* (2013.01); *H04B 7/0871* (2013.01); *H04R 2420/01* (2013.01); *H04R 2420/07* (2013.01)

(58) Field of Classification Search
CPC .. H04B 7/0871; H04B 7/0874; H04B 7/0814; H04B 7/0825; H04B 7/0802; H04B 7/0888; H04R 3/005; H04R 2420/07

USPC .......... 375/340, 347; 455/277.2; 381/81, 10, 381/311, 85

See application file for complete search history.

(56) References Cited

U.S. PATENT DOCUMENTS

| | | | |
|---|---|---|---|
| 6,792,258 B1 * | 9/2004 | Nokes ................. | H04B 7/0871 375/347 |
| 2006/0067442 A1 * | 3/2006 | Tanaka ................ | H04B 7/0811 375/347 |
| 2011/0249831 A1 * | 10/2011 | Bellamy .............. | H04B 7/0874 381/94.1 |
| 2011/0311001 A1 * | 12/2011 | Lindenbauer ........ | H04B 7/0814 375/340 |
| 2016/0248894 A1 * | 8/2016 | Hosoi ..................... | H04M 1/03 |

* cited by examiner

*Primary Examiner* — Vivian Chin
*Assistant Examiner* — Ubachukwu Odunukwe
(74) *Attorney, Agent, or Firm* — Alan D. Kamrath; Kamrath IP Lawfirm, P.A.

(57) ABSTRACT

A switching device is adapted for a true diversity receiver and contains: a control switch defined between two microcontrollers of two antennas and configured to switch RF wireless microphone signals so that the two microcontrollers execute a single-receiving dual true diversity program or a dual-receiving single true diversity program. The RF wireless microphone signals are received by the two antennas and are decoded to sound signals by two digital decoders respectively, and the sound signals are sent to two audio signal processors by a multiplexer which corresponds to the two microcontrollers to switch the sound signals of a single-receiving dual true diversity or a dual-receiving single true diversity. Thereafter, the sound signals are output by a sound signal mixer.

4 Claims, 3 Drawing Sheets

SWITCHING DEVICE FOR A TRUE DIVERSITY RECEIVER

BACKGROUND OF THE INVENTION

Field of the Invention

The present invention relates to a switching device adapted for a true diversity receiver, so that two antennas receive radiofrequency (RF) wireless microphone signals of one or two wireless microphones, and so that the RF wireless microphone signals are switched to sound signals of single-receiving dual true diversity or dual-receiving single true diversity. Hence, each of the two antennas corresponds to and mates with a single one of the two wireless microphones or the two antennas correspond to and mate with the single one of the two wireless microphones to enhance an effective distance of the true diversity receiver.

Description of the Prior Art

A conventional true diversity receiver is applicable for a single-receiving dual true diversity mode or a dual-receiving single true diversity mode. For instance, in the dual-receiving single true diversity mode, a single one of multiple wireless microphones corresponds to a single one of multiple antennas. Even though the multiple wireless microphones receive and output sound signals via the multiple antennas, their receiving ranges are small (i.e., effective distance is short). Thus, the multiple wireless microphones are only used indoors, such as a classroom or a KTV box. In the single-receiving dual true diversity mode, the single wireless microphone corresponds to and receives signals from two antennas, receiving ranges of the two antennas overlap, and dead spaces of the receiving ranges are eliminated to increase the receiving ranges (i.e., the effective distance is long). Thereby, the multiple wireless microphones are used outdoors.

However, the conventional true diversity receiver is merely applicable for the single-receiving dual true diversity mode or the dual-receiving single true diversity mode. Accordingly, when the conventional true diversity receiver is employed in the dual-receiving single true diversity mode outdoors, the single wireless microphone stops receiving and transmitting signals in a limited effective range. When the conventional true diversity receiver is employed in the single-receiving dual true diversity mode indoors, the multiple wireless microphones interfere with one another, thus limiting the receiving ranges.

The present invention has arisen to mitigate and/or obviate the afore-described disadvantages.

SUMMARY OF THE INVENTION

The primary objective of the present invention is to provide a switching device adapted for a true diversity receiver which contains a control switch defined between two microcontrollers of two antennas and configured to switch radio frequency (RF) wireless microphone signals from two wireless microphones. The two microcontrollers execute a single-receiving dual true diversity program or a dual-receiving single true diversity program via the control switch. Hence, after the control switch switches to the dual-receiving single true diversity, the two antennas receive the RF wireless microphone signals respectively from the two wireless microphones, and the RF wireless microphone signals transmit to a digital decoder via a microcontroller and are decoded to sound signals by the digital decoder. Thereafter, the sound signals are sent to an audio signal processor by a multiplexer and are outputted by a sound signal mixer, thus using the two wireless microphones simultaneously.

A further objective of the present invention is to provide a switching device adapted for a true diversity receiver which when the control switch switches the RF wireless microphone signals so that the two microcontrollers execute the single-receiving dual true diversity program, the two antennas simultaneously receive the RF wireless microphone signals of one of the two wireless microphones, and the multiplexer corresponds to the two microcontrollers and outputs sound signals. Hence, receiving ranges of the two antennas overlap, dead spaces (since angles and positions of the two antennas are different, the dead spaces of the two antennas are variable) are eliminated, and an effective receiving distance of the true diversity receiver increases (for example, when the effective receiving distance of the true diversity receiver is 50 meters, when a maximum distance is 100 meters, and after the two antennas receive the RF wireless microphone signals and eliminate the dead spaces, the effective receiving distance of the true diversity receiver is enhanced to 80 meters). Thus, a single one of the two wireless microphones has a greater transmission distance based on different using requirements.

To obtain above objectives, a switching device provided by a preferred embodiment of the present invention contains: a control switch defined between two microcontrollers of two antennas and configured to switch RF wireless microphone signals so that the two microcontrollers execute a single-receiving dual true diversity program or a dual-receiving single true diversity program. The RF wireless microphone signals are received by the two antennas and are decoded to sound signals by two digital decoders respectively, and the sound signals are sent to two audio signal processors by a multiplexer which corresponds to the two microcontrollers to switch the sound signals of single-receiving dual true diversity or dual-receiving single true diversity. Thereafter, the sound signals are outputted by a sound signal mixer.

In another embodiment, a switching device is adapted for a true diversity receiver, and the true diversity receiver contains two antennas. Each of the two antennas includes a radiofrequency signal receiver, and each antenna receives radiofrequency (RF) wireless microphone signals from two wireless microphones. The RF wireless microphone signals are transmitted to a digital decoder via a microcontroller and are decoded to sound signals by the digital decoder. Thereafter, the sound signals are sent to an audio signal processor by a multiplexer and are outputted by a sound signal mixer. Preferably, between two microcontrollers of the two antennas is defined a control switch configured to switch the RF wireless microphone signals so that the two microcontrollers execute a single-receiving dual true diversity program or a dual-receiving single true diversity program. The multiplexer corresponds to the two microcontrollers to switch the sound signals of single-receiving dual true diversity or dual-receiving single true diversity.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
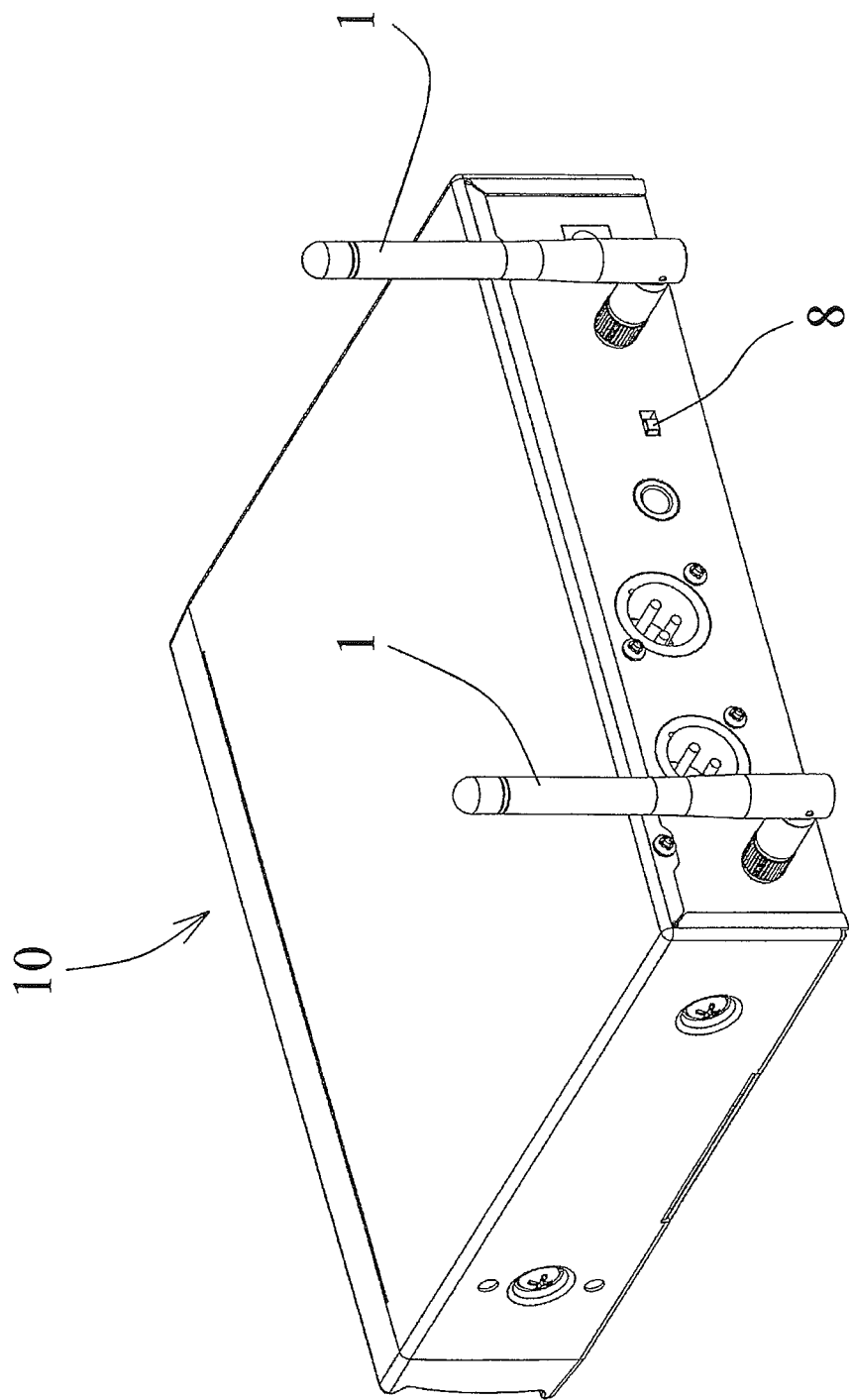
FIG. 1 is a perspective view showing the assembly of a switching device of a true diversity receiver in accordance with a preferred embodiment of the present invention.
Figure 2:
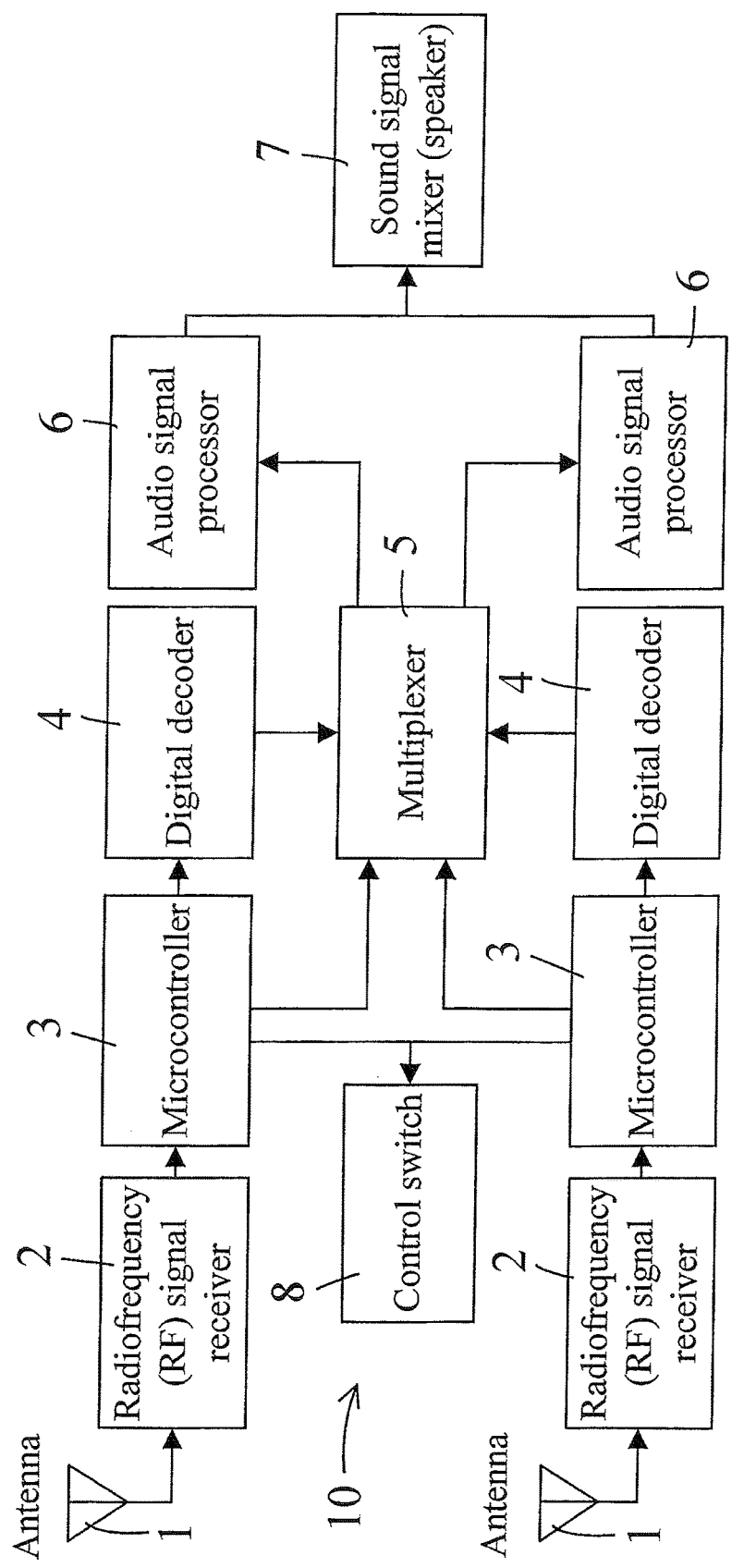
FIG. 2 is a circuit block diagram of the switching device of the true diversity receiver in accordance with the preferred embodiment of the present invention.
Figure 3:
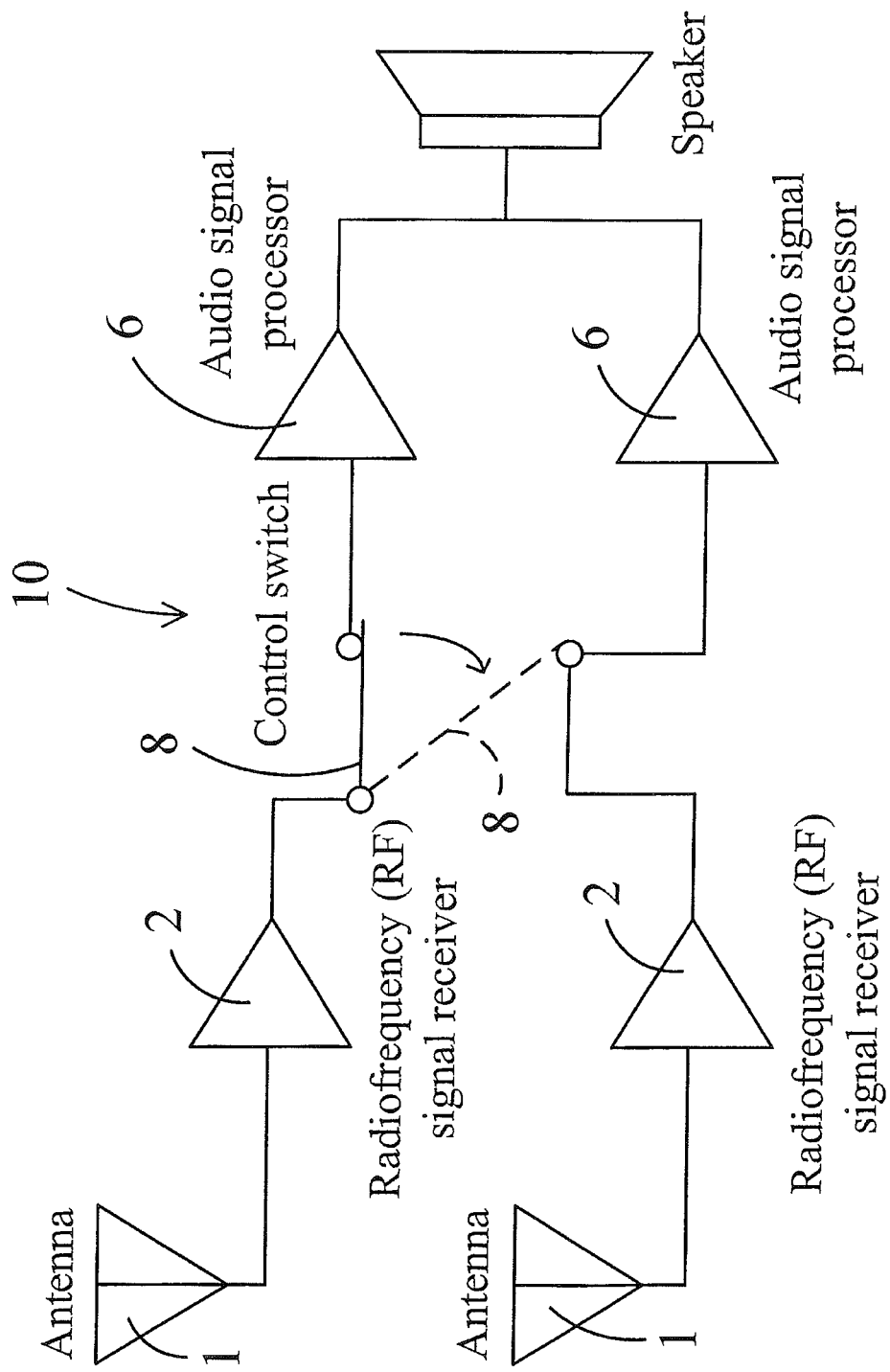
FIG. 3 is another circuit block diagram of the switching device of the true diversity receiver in accordance with the preferred embodiment of the present invention.

A switching device according to a preferred embodiment of the present invention is adapted for a true diversity receiver 10, and the true diversity receiver 10 comprises two antennas 1 (as shown in FIG. 1). Each of the two antennas 1 includes a radiofrequency signal receiver 2, so that each antenna 1 receives radiofrequency RF wireless microphone signals from two wireless microphones, and the RF wireless microphone signals transmit to a digital decoder 4 via a microcontroller 3 and are decoded to sound signals by the digital decoder 4 (as illustrated in FIGS. 2 and 3). Thereafter, the sound signals are sent to an audio signal processor 6 by a multiplexer 5 and are outputted by a sound signal mixer 7 (such as a speaker). Between two microcontrollers 3 of the two antennas 1 is defined a control switch 8 configured to switch the RF wireless microphone signals, so that the two microcontrollers 3 execute a single-receiving dual true diversity program or a dual-receiving single true diversity program. The multiplexer 5 corresponds to the two microcontrollers 3 to switch the sound signals of single-receiving dual true diversity or dual-receiving single true diversity.

As the control switch 8 switches the RF wireless microphone signals so that the two microcontrollers 3 execute the dual-receiving single true diversity program, the two antennas 1 correspond to the two wireless microphones and receive RF wireless microphone signals of the two wireless microphones respectively. Two digital decoders 4 decode the RF wireless microphone signals to the sound signals. Thereafter, the sound signals are outputted by two sound signal mixers 7, individually. Hence, the two wireless microphones are not interfered by each other (in a KTV box). When the control switch 8 switches the RF wireless microphone signals so that the two microcontrollers 3 execute the single-receiving dual true diversity program (the multiplexer 5 switches to the single-receiving dual true diversity mode based on the single-receiving dual true diversity function of the two microcontrollers 3 or switches to the dual-receiving single true diversity mode according to the dual-receiving single true diversity function of the two microcontrollers 3). The two antennas 1 receive RF wireless microphone signals of one of the two wireless microphones, and the two microcontrollers 3 control the multiplexer 5 synchronously. For example, when a first antenna 1 receives stronger RF wireless microphone signals, a first microcontroller 3 chooses and outputs the sound signals decoded by the first antenna 1 via the multiplexer 5. In contrast, when a second antenna 1 receives the stronger RF wireless microphone signals, a second microcontroller 3 chooses and outputs the sound signals decoded by the second antenna 1 via the multiplexer 5, thus enhancing the using range of the two wireless microphones (i.e., enhancing the effective distance of the true diversity receiver 10).

Accordingly, the two wireless microphones are used simultaneously by way of the switching device, and a single one of the two wireless microphones is applied after switching to the single-receiving dual true diversity mode to increase the using range (such as hosting an event or making a speech outdoors).

The control switch 8 is a slide switch or a transfer switch. For example, when the slide switch is switched to an ON mode, it sends a low signal to the two microcontrollers 3, and after the two microcontrollers 3 receive the low signal, they execute the single-receiving dual true diversity program. When the slide switch is switched to an OFF mode, it sends a high signal to the two microcontrollers 3, and after the two microcontrollers 3 receive the high signal, they execute the dual-receiving single true diversity program.

While various embodiments in accordance with the present invention have been shown and described, it is clear to those skilled in the art that further embodiments may be made without departing from the scope of the present invention.

What is claimed is:

1. A switching device adapted for a true diversity receiver comprising:

a control switch operably coupled between two microcontrollers of two antennas and configured to switch radio frequency (RF) wireless microphone signals, wherein the two microcontrollers execute a single-receiving dual true diversity program in which both of the two antennas correspond to and mates with a single wireless microphone or a dual-receiving single true diversity program in which each of the two antennas correspond and mate with a single one of two wireless microphones, wherein the RF wireless microphone signals are received by the two antennas and are decoded to sound signals by two digital decoders respectively, wherein the sound signals are sent to two audio signal processors by a multiplexer based upon signals received from the two microcontrollers to switch the sound signals between a single-receiving dual true diversity program and a dual-receiving single true diversity program, wherein in single-receiving dual true diversity program, a corresponding microcontroller chooses and outputs the sound signals decoded by the corresponding antenna receiving the stronger RF wireless microphone signal via the multiplexer, wherein the sound signals are output by a sound signal mixer, and wherein when the control switch is switched to an on mode, a low signal is sent to the two microcontrollers which then execute the single-receiving true diversity program, and wherein when the switch is switched to an off mode, a high signal is sent to the two microcontrollers which then execute the dual-receiving single true diversity program.

2. The switching device as claimed in claim 1, wherein the control switch is a slide switch.

3. A switching device being adapted for a true diversity receiver, the device comprising: two antennas, each of the two antennas including a radio frequency signal receiver, wherein each antenna is configured to receive radio frequency (RF) wireless microphone signals from two wireless microphones and to transmit the RF wireless microphone signals to a digital decoder via a microcontroller the RF wireless microphone signals decoded to sound signals by the digital decoder, and further wherein the sound signals are sent to an audio signal processor by a multiplexer and are outputted by a sound signal mixer;

wherein a control switch is operably coupled between the two microcontrollers of the two antennas and is configured to switch the RF wireless microphone signals so that the two microcontrollers execute a single-receiving dual true diversity program in which both of the two antennas correspond to and mates with a single wireless microphone or a dual-receiving single true diversity program, wherein when the control switch is switched to the on mode, a low signal is sent to the two microcontrollers which then execute the single-receiving true diversity program, and wherein when the switch is switched to the off mode, a high signal is sent to the two microcontrollers which then execute the dual-receiving single true diversity program, wherein the multiplexer, based upon signals received from the two micro controllers of the two antennas, switches the sound signals between a single-receiving dual true diversity program and a dual-receiving single true diversity program in which each of the two antennas correspond and mate with a single one of two wireless microphones, and wherein the two microcontrollers control the multiplexer synchronously, and further wherein, in single-receiving dual true diversity program, a corresponding microcontroller chooses and outputs the sound signals decoded by the corresponding antenna receiving the stronger RF wireless microphone signal via the multiplexer.

4. The switching device as claimed in claim 3, wherein the control switch is a slide switch.

* * * * *